United States Patent [19]

Hsieh

[11] Patent Number: 5,164,644
[45] Date of Patent: Nov. 17, 1992

[54] APPARATUS FOR CONTROLLING A CEILING FAN

[76] Inventor: Frank Hsieh, No. 103 Ta Feng Road, Sheng Kang Hsiang, Taichung Hsien, Taiwan

[21] Appl. No.: 772,423

[22] Filed: Oct. 7, 1991

[51] Int. Cl.⁵ .............................................. H02P 7/36
[52] U.S. Cl. ..................... 318/284; 318/285; 318/16; 318/751
[58] Field of Search ................. 318/16, 256, 257, 264, 318/268, 272, 280, 283, 284, 285, 287, 289, 291, 293, 445, 452, 453, 751, 752; 388/825, 830, 831, 903

[56] References Cited

U.S. PATENT DOCUMENTS

| | | | |
|---|---|---|---|
| 4,371,814 | 2/1983 | Hannas | 318/16 |
| 4,426,615 | 1/1984 | Hannas | 323/322 |
| 4,465,956 | 8/1984 | Fowler | 318/268 |
| 4,621,992 | 11/1986 | Angott | 417/572 |
| 4,716,409 | 12/1987 | Hart et al. | 340/825.22 |
| 4,719,446 | 1/1988 | Hart | 340/310 A |
| 4,818,920 | 4/1989 | Jacob | 318/16 |
| 4,990,908 | 2/1991 | Tung | 340/825.63 |
| 5,041,825 | 8/1991 | Hart et al. | 340/825.06 |

Primary Examiner—Bentsu Ro

[57] ABSTRACT

The improvement of a remotely controlled ceiling fan is achieved mainly by means of a function control IC communicating with TRIAC $Q_8$, TRIAC $Q_9$ and TRIAC $Q_{10}$ of the speed-changing device via lines $Q_5$, $Q_6$ and $Q_7$ connecting respectively with points 11, 12 and 13 of the function control IC, so as to transmit a command from the function control to the speed-changing device which in turn controls the speed of motor. The function control IC is additionally provided at point 16 thereof with a delay device, which in turn is connected to a relay via line $Q_{11}$. The primary line coil of the motor communicates with the relay intended to initiate a change in the polarity of the primary line coil of motor at the time when the function control IC receives a command to put the operation of motor in reverse and the speed-changing device is halted temporarily. As soon as the command calling for the motor to operate in reverse is executed, the speed-changing device resumes operating to control the speed of the motor.

3 Claims, 3 Drawing Sheets

APPARATUS FOR CONTROLLING A CEILING FAN

BACKGROUND OF THE INVENTION

The present invention relates to a ceiling fan, and more particularly to an improved ceiling fan which can be remotely controlled.

In general, the conventional ceiling fan of the prior art, which can be remotely controlled, can be operate at high, medium, and low speeds. It can also be reversed. Some of the prior art ceiling fans are additionally equipped with a lighting device so as to enhance the marketability of ceiling fans.

However, the prior art ceiling fans have defects, which are further expounded explicitly hereinafter.

The operations in both forward and backward directions of the prior art ceiling fans are generally made possible by several methods. One of the methods used involves a situation, in which the operation of the fan in reverse and the stoppage of the motor take place simultaneously or in which the operation of the fan in reverse takes place while the motor stops temporarily and then resumes operation without using a detour or a bypass element. Other methods may involve several situations, in which the operation in reverse of the fan is possible only afte the fan in question has been put into a complete stop, or in which the operation in reverse of the fan can be done by following certain specified cyclic procedures, or in which the operation in reverse of the fan can be done directly without having to stop the fan in question in the first place.

The methods mentioned above are all defective in that they may bring about a fluctuation of the electric voltage, which may be four or five times greater than that of the power source, and of the electric current approaching 60 amperes or more. As a result, the motor and other components arranged along the power line are overloaded to the fluctuation of voltage and current by means of additional protective components, thereby resulting in making the power line structure too complicated and bringing about additional power consumption.

Of course, the motor can be first stopped manually by the user of the fan so as to put the fan in question into operation in reverse. However, such operating method can be quite inconvenient to the user and can result in shortening the service life of the fan by subjecting various components of the fan in question to damages.

In order to prevent the electric current supplied to the fan from fluctuating irregularly and wildly, the voltage of alternating current is first lowered to an appropriate level by means of a transformer and is subsequently rectified and filtered to become a power source in the form of direct current. But such procedures are defective in that the transformer is expensive, heavy in weight, bulky in size, and noisy, and that there is no unified specification of transformer, thereby making it difficult for the user to purchase a suitable transformer, and further that the operating transformer may raise the temperature to the extent that the service life of the components adjacent to the transformer may be adversely affected.

SUMMARY OF THE INVENTION

It is therefore the primary objective of the present invention to provide a remotely controlled ceiling fan with a motor which can be reversed automatically when the motor in question is in a non-conductive status so as to prevent the incidents of violent fluctuations of electric voltage and current from taking place, thereby resulting in promoting the service efficiency of the components and prolonging the service life of the components and further in a substantial reduction in thre cost of making a remotely controlled ceiling fan.

It is another objective of the present invention to provide a remotely controlled ceiling fan with a capacitor intended to lower the voltage of alternating current to an appropriate level, at which the alternating current is subsquently rectified and filtered, thereby resulting in simplifying and unifying the power line structures of the ceiling fan, which consumes less energy and can be manufactured at a lower cost.

It is still another objective of the present invention to provide a remotely controlled ceiling fan with a capacitor, which is less prone to generate heat energy to raise the surrounding temperature (only about 5 degrees in Celsius higher than that of the operating capacitor) to the extent that the components adjacent to the capacitor in question are subjected to damages.

It is still another objective of the present invention to provide a remotely controlled ceiling fan, which is quiet, light in weight, relatively small in size, and can be made economically.

The features, objectives, and advantages of the present invention will be better understood by studying the following detailed description of the preferred embodiment, in conjunction with the drawings provided herein.

DETAILED DESCRIPTION OF THE PREFERRED EMBODIMENT

Figure 1:
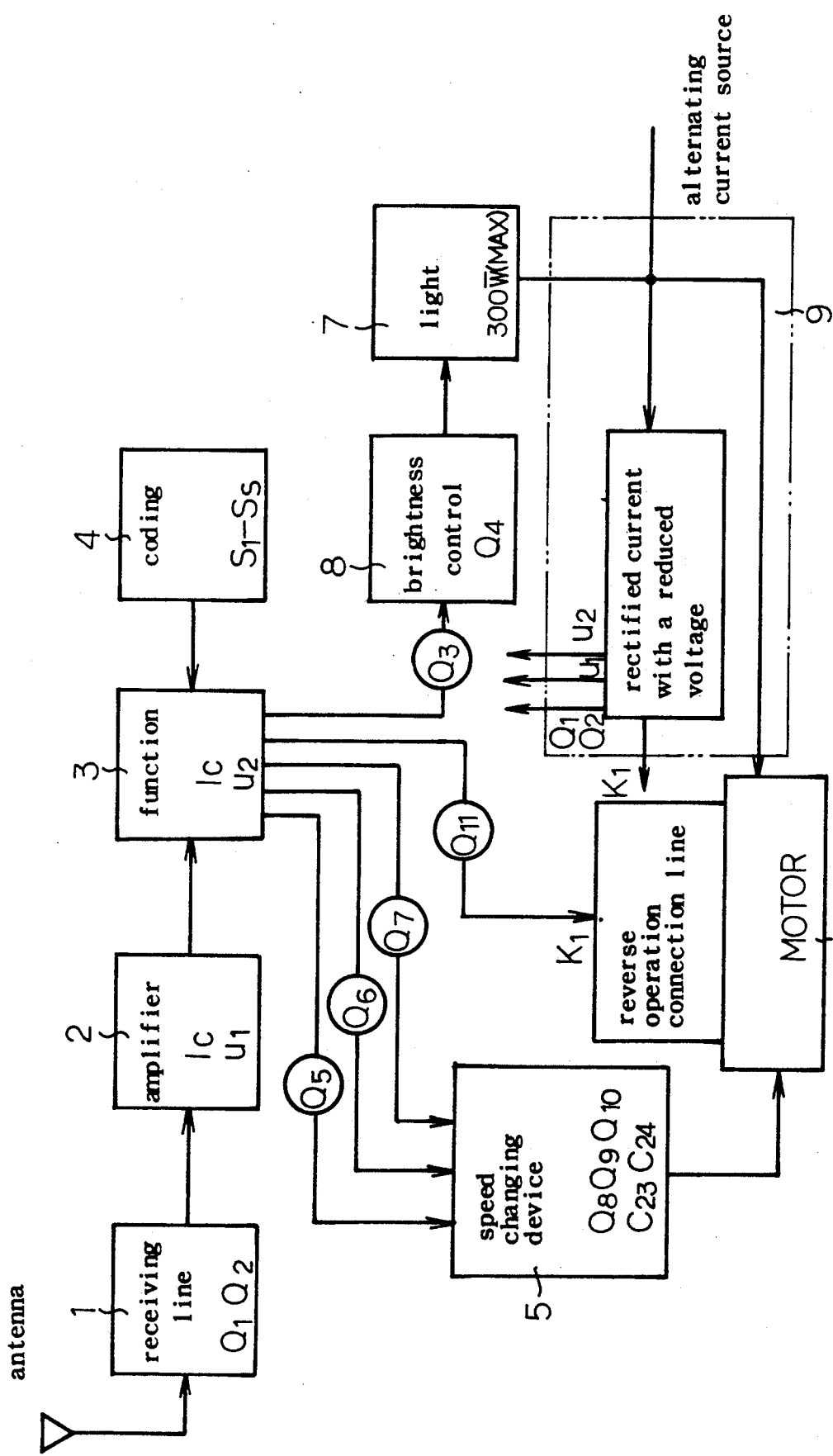
FIG. 1 shows a block diagram of a receiver of the remotely controlled ceiling fan embodied in the present invention.

Referring to FIG. 1, the remotely controlled ceiling fan embodied in the present invention is shown comprising receiving line 1, an amplifier 2, a function control IC 3, an encoder 4, a speed-changing device 5, a motor 6, a lighting device 7, a brightness control 8, and a source of direct current 9. In addition, a transmitter is included in the present invention but is not shown in the drawings provided herein because it is beyond the scope of the present invention.

Figure 2:
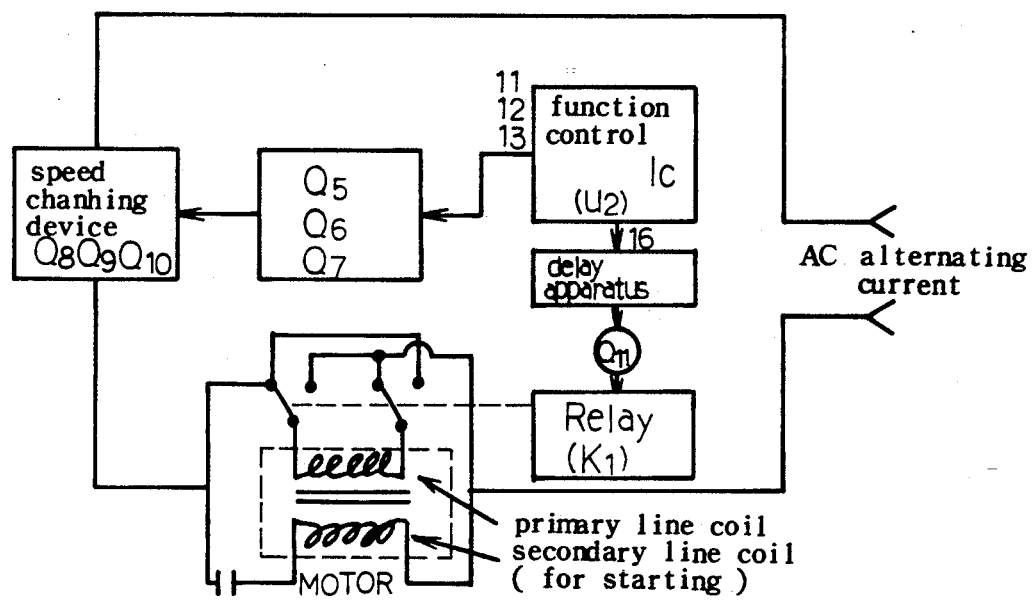
FIG. 2 shows a circuit control diagram of forward and backward movements of the motor of the remotely controlled ceiling fan according to the present invention.

As shown in FIG. 2, the function control IC(U2) is provided with points 11, 12 and 13, which communicate respectively with $Q_8$ (TRIAC), $Q_9$ (TRIAC) and $Q_{10}$ (TRIAC) of the speed-changing device via lines $Q_5$, $Q_6$ and $Q_7$, so as to transmit the commands from the function control to the speed-changing device, which in turn controls the speed of the motor. The function control IC(U2) is additionally provided at point 16 with a delay apparatus, which is connnected with the relay ($K_1$) via line $Q_{11}$. The connection terminal of the primary line coil of the motor is in contact with the main connection point of the relay ($K_1$). Such schemes as described above have the advantages, which are expounded explicitly hereinafter.

If function control IC($U_2$) receives a command to reverse the operation of the motor, such command information is passed on to the relay ($K_1$) at the same time when lines $Q_5$, $Q_6$ and $Q_7$ are put out of operation temporarily form a moment. Thereafter the lines $Q_5$, $Q_6$ and $Q_7$ automatically resume assuming their original status of operation.

The motor can be put to an immediate halt as soon as the speed-changing device is stopped by shutting off lines $Q_5$, $Q_6$ and $Q_7$.

The command intended to reverse the action of the motor can trigger the relay ($K_1$), which in turn changes the polarity of the connection of the primary line coil of the motor. The reverse in the polarity of the connection of the primary line coil will bring about the reverse motion of the motor. This process described above is brought to a completion when the operation of the motor is halted for a moment to facilitate the arrangement of the main action that is called for.

The change in the polarity of the connection point of the primary line coil is achieved by the relay ($K_1$) at the time when the motor is completely devoid of electric current, thereby preventing the sudden and violent fluctuations of voltatge (reaching as high as 500 V or more) and current (reaching as high as 60 A or more) from taking place, and further averting the incident of sparkling by the connection points. Accordingly, the service life spans of the various componnets are effectively prolonged.

Figure 4:
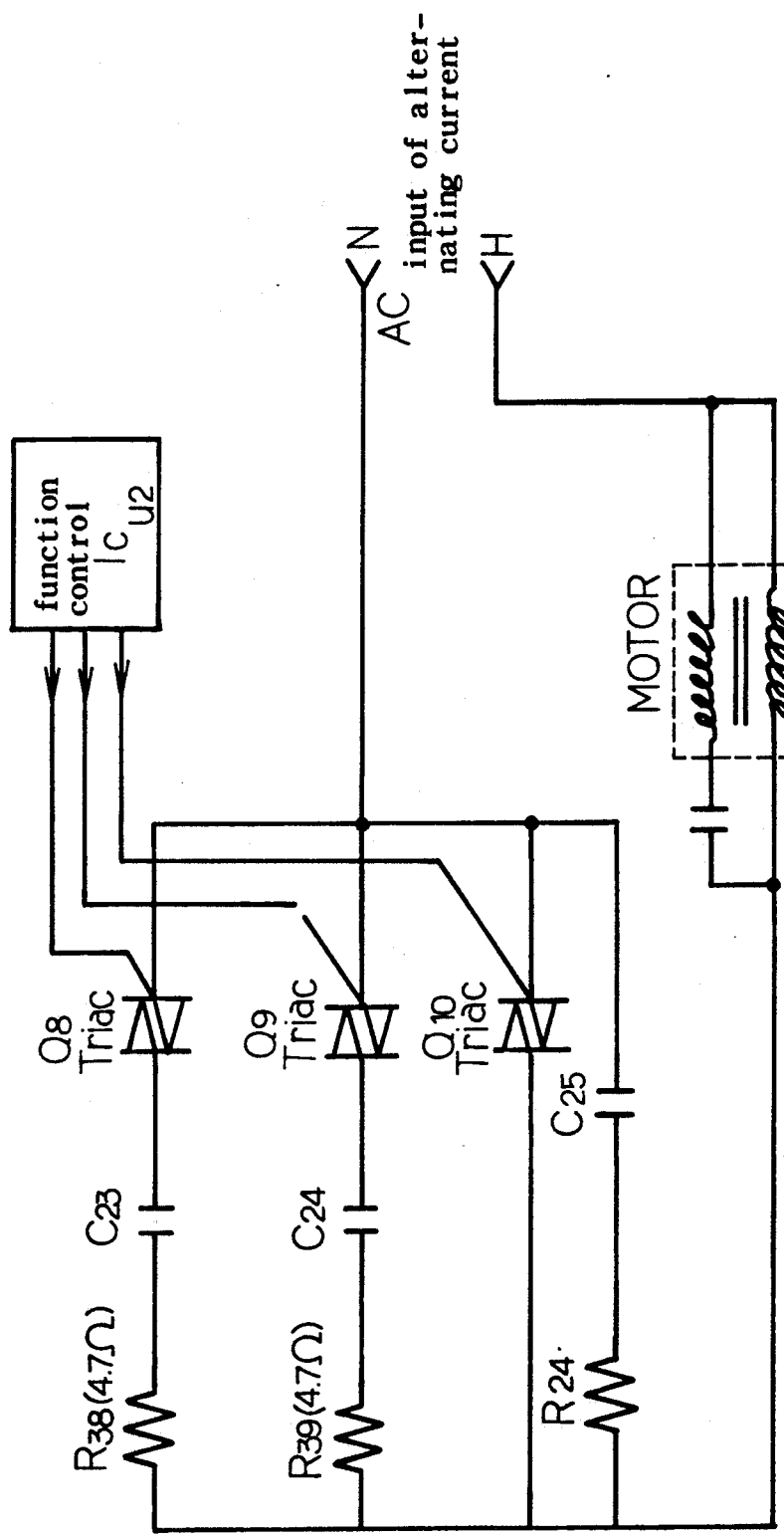
FIG. 4 shows a circuitry of the speed-changing device of the motor of the remotely controlled ceiling fan according to the present invention.

As shown in FIG. 4, the speed-changing device used in the present invention is similar to the prior art and will not be explained here.

Figure 3:
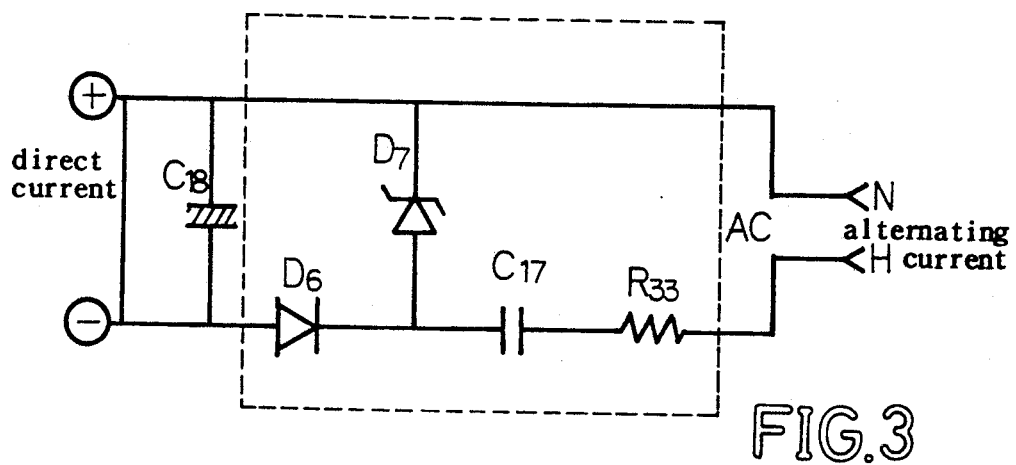
FIG. 3 shows a circuitry of alternating current and direct current of the remotely controlled ceiling fan of the present invention.

Now referring to FIG. 3, the circuitry of the function control elements of the present invention is shown comprising a resistor ($R_{33}$), a capacitor ($C_{17}$) for lowering the voltage, two rectifying diodes ($D_6$ and $D_7$), and a capacitor ($C_{18}$) for filtering the current. The relatively high voltage of alternating current is lowered through the resistor ($R_{33}$) and the capacitor ($C_{17}$) and is subsequently rectified and stabilized via diodes ($D_6$ and $D_7$). The alternating current so rectified and stabilized is further subjected to the filtering process done by the capacitor ($C_{18}$) in order to become direct current as a power source to various components of the ceiling fan. This innovative technology as described above is simple; nevertheless it has never been successfully employed in the ceiling fan or the electric fan. Such technology as embodied in the present invention ensures that both quality and service life of a ceiling fan are improved.

In conclusion, the advantages of the ceiling fan of the present invention over the prior art ceiling fans have become apparent. As far as the present invention is concerned, the motion of the ceiling fan motor is reversed when the motor is halted temporarily. In other words, the motor of the ceiling fan of the present invention can be automatically commanded to reverse itself whether the motor is in operation or not. In addition, the incidents of sudden and wild fluctuations of voltage and current are effectively averted. As a results, the specifications of the fan components are simplified and reduced to the extent that the line protection can be minimized. Furthermore, the ceiling fan of the present invention does not use a transformer and thus has advantages which include a noise-free operation, an absence of over-heating, a significant reduction in weight, and a substantial improvement in quality.

What I claim is:

1. An apparatus for controlling a ceiling fan, comprising:
    a motor for driving said ceiling fan;
    a speed changing device having at least three triacs for controlling the speed of said motor; and
    a function control IC;
    wherein said function control IC comprises at least three control terminals respectively connected to said at least three triacs for actuating said triacs for controlling the speed of said motor; said function control IC further comprises an additional terminal connected, via a delay apparatus, to a relay; said relay having contact points connected to a primary coil of said motor for reversing the polarity of said primary coil;
    wherein said speed changing device is deactivated for a predetemined period of time when said function control IC receives a command signal to reverse the rotational direction of said motor; said function control IC further changes the state of said relay upon receiving said reversing command signal; and
    wherein the changing state of said relay reverses the polarity of said primary coil of said motor during the deactivation of said speed changing device in said predetermined period of time; said speed changing device resumes its operation after expiration of said predetermined period of time.

2. The apparatus for controlling a ceiling fan according to claim 1, further comprising:
    a transmitting means for remotely transmitting control signals;
    a receiving means for receiving said control signals to control the speed and the rotational direction of said motor; and
    an amplifier for amplifying said control signals.

3. The apparatus for controlling a ceiling fan according to claim 2, further comprising:
    a lighting device; and
    a brightness control means for controlling the brightness of said lighting device.

* * * * *